E. Maynard.
Electrical Conductor.
N°22,922. Patented Feb. 8, 1859.
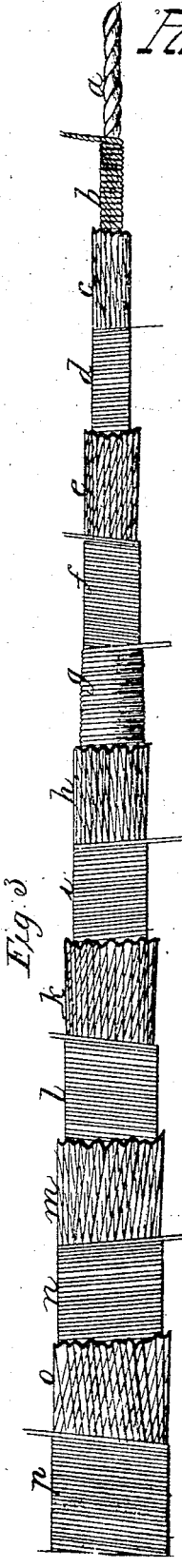
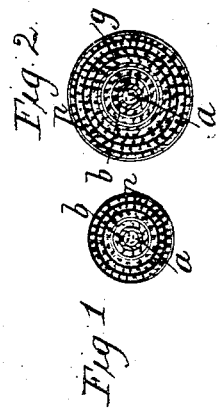
Witnesses;
Lemuel W. Serrell
Thomas G. Harold
Inventor;
E. Maynard

UNITED STATES PATENT OFFICE.

EDWARD MAYNARD, OF BROOKLYN, NEW YORK, ASSIGNOR TO HIMSELF AND R. K. SLAUGHTER AND THO. E. PURDY.

IMPROVED METHOD OF COVERING WITH FIBROUS MATERIAL SUBMERGED SPIRAL ELECTRODES FOR SHORT DISTANCES.

Specification forming part of Letters Patent No. 22,922, dated February 8, 1859.

*To all whom it may concern:*

Be it known that I, EDWARD MAYNARD, of Brooklyn, in the county of Kings and State of New York, have invented, made, and applied to use certain new and useful Improvements in Submarine Telegraph-Cables; and I do hereby declare that the following is a full, clear, and exact description of the construction and operation of my said invention, reference being had to the annexed drawings, making part of this specification, wherein—

Figure 1 is a cross-section of my said cable with one conductor. Fig. 2 is a cross-section of a cable with two conductors; and Fig. 3 is a side view of the cable complete and in the various stages of manufacture.

Similar marks of reference denote the same parts.

The nature of my said invention consists in the use of parallel cords or strings of hemp, flax, silk, or other fibrous material in connection with a twisted conductor or conductors, whereby all strain in laying said cable into the water is taken on the said strands of fibrous material and the conductor entirely relieved from strain or liability to break, and, beside this, the insulation is far more perfect than with those materials, such as gutta-percha, that are liable to break open under strain and destroy the insulation.

I take a strand or cord, $a$, of fibrous material and wind around the same the conductor $b$, composed of one or more wires of a suitable size. I then surround the same with longitudinal parallel cords or strands of fibrous non-conducting material, $c$, and wind around the same a serving of string or thread, and during the operation of laying up I saturate this fibrous material $c$ and all that is used surrounding the same with wax or similar non-conducting water-proof material, by the application of heat to liquefy the same, or by the use of suitable material in solution.

$d$ is a serving around the cords $c$. $e$ is a second layer of parallel cords, and $f$ is the serving to the same. If only one conductor is to be used, a covering of iron wire is to be applied, as hereinafter set forth, to complete the cable, as in Fig. 1; but if two conductors are to be used I apply the second, as at $g$, the same being composed of one or more wires wound around the previous fibrous material, $e f$.

$h$ and $k$ are the parallel cords of fibrous material, and $l\ m$ are the windings or servings of thread or twine. The alternate layers of the strands being composed of cords twisted in opposite directions and coated or saturated successively with wax, there is no liability for the cable to twist or kink, and at the same time a perfect insulation is effected.

$m$ is a layer of wires twisted around the cable (outside the serving $l$ or $f$) with a gradual curvature and served over, as at $m$; and $o$ is another layer of wires, rather finer than the wires $m$, and twisted in the opposite directions; and $p$ is the serving to the same.

By this manner of constructing telegraph-cables for submarine use a very strong article is produced, and one that is not liable to twist or kink, and is thoroughly insulated, and all strain is taken on the cords and wire-covering which are parallel or only slightly twisted, and the intervening serving prevents the layers of fibrous materials separating longitudinally of the cable, and the conductor or conductors having a twist in them are relieved from strain almost entirely.

I do not claim a telegraph-cable in which strands of fibrous materials or wires are used; neither do I claim a serving wound around the same; but there is no previous instance with which I am acquainted in which a conductor in a twisted or more or less helical form has been inclosed in layers formed by parallel strands of cord, string, or other fibrous material served or wound around over the successive layers at the same time that melted wax or other non-conducting water-proof material is used to saturate said cable and thereby produce a durable water-proof cable in which the conductor is relieved from strain and perfectly insulated as specified.

What I claim as my invention, and desire to secure by Letters Patent, is—

Constructing submarine telegraph-cables of metallic conductors twisted in a helical form, in combination with layers of cords or strings parallel, or nearly so, with the axis of the cable, that are confined together by a serving or winding and are saturated with water-proof non-conducting material, as set forth.

In witness whereof I have hereunto set my signature this 23d day of October, 1858.

E. MAYNARD.

Witnesses:
LEMUEL W. SERRELL,
THOMAS G. HAROLD.